No. 887,756. PATENTED MAY 19, 1908.
W. D. BERRY.
SAND MOLDING APPARATUS.
APPLICATION FILED JUNE 12, 1907.
2 SHEETS—SHEET 1.
FIG. 1
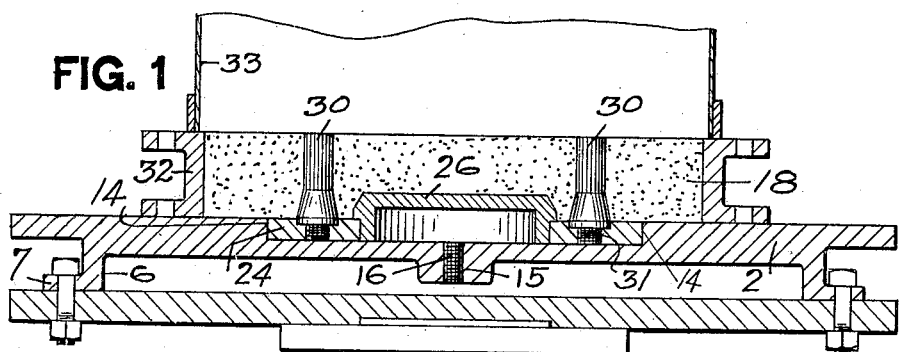
FIG. 2
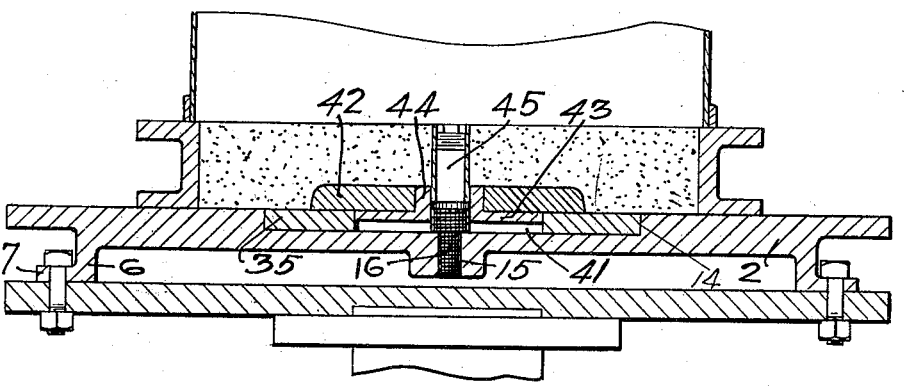
FIG. 3
WITNESSES. INVENTOR.

No. 887,756. PATENTED MAY 19, 1908.
W. D. BERRY.
SAND MOLDING APPARATUS.
APPLICATION FILED JUNE 12, 1907.
2 SHEETS—SHEET 2.
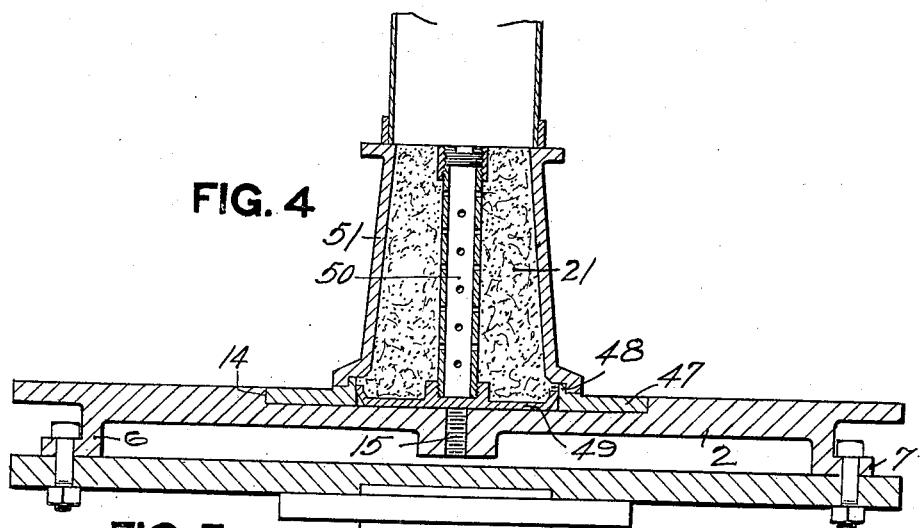
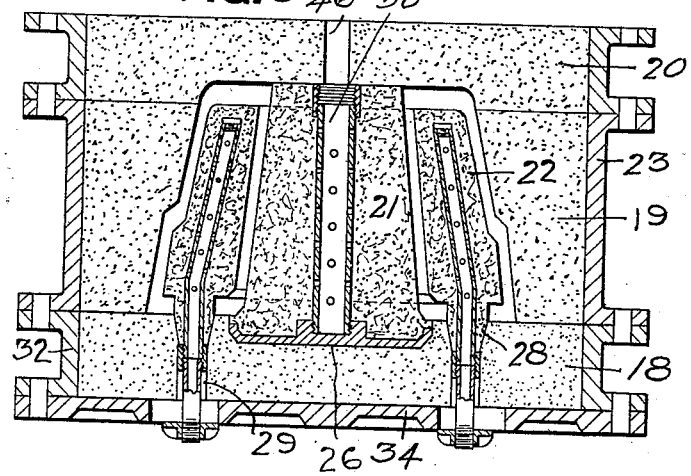
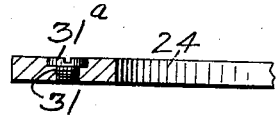
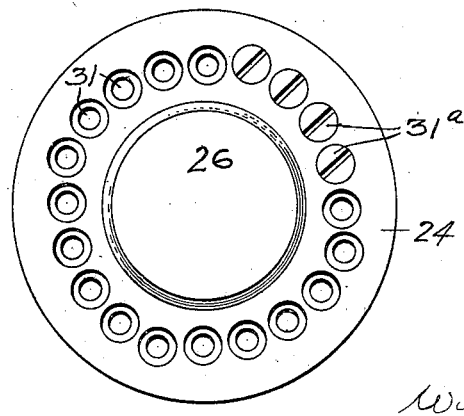
WITNESSES. INVENTOR.

UNITED STATES PATENT OFFICE.

WILLIAM D. BERRY, OF NEW BRIGHTON, PENNSYLVANIA.

SAND-MOLDING APPARATUS.

No. 887,756.   Specification of Letters Patent.   Patented May 19, 1908.

Application filed June 12, 1907. Serial No. 378,632.

*To all whom it may concern:*

Be it known that I, WILLIAM D. BERRY, a resident of New Brighton, in the county of Beaver and State of Pennsylvania, have invented a new and useful Improvement in Sand-Molding Apparatus; and I do hereby declare the following to be a full, clear, and exact description thereof.

This invention relates to apparatus for making sand molds and more especially apparatus adapted for the jarring process.

The object of the invention is to provide simple apparatus for making three-part molds and especially so arranged that a few interchangeable parts can be adapted for making the three parts of the mold and in a manner to dispense largely with skilled labor and produce accurate and perfect molds.

The invention comprises the construction and arrangement of parts hereinafter described and claimed.

In the accompanying drawings Figure 1 is a vertical section through a molding machine plate showing mold parts for forming the drag; Fig. 2 is a similar view showing mold parts for forming the intermediate or cheek portion of the mold; Fig. 3 is a similar view showing mold parts for forming the cope; Fig. 4 is a similar view showing the adaptation of the machine plate for forming a core; Fig. 5 is a sectional view through the assembled mold to show the relation of the cavities formed in the three mold parts; Fig. 6 is a plan view of the mold bottom plate used in making the drag; and Fig. 7 is a detail sectional view thereof.

This invention provides mold parts which can be used with any form of jarring apparatus.

In the drawings only a part of an ordinary jarring machine is shown, being the machine plate 2 which will be mounted for vertical reciprocation and can be jarred by any suitable mechanism. The machine plate 2 is of special construction, having the downwardly projecting ring 6 provided with perforated ears 7 for securing the same to the reciprocating member of the machine. The machine plate is provided with a depressed portion 14 in order to receive and hold centrally interchangeable molding parts for use in forming the different parts of the mold. Centrally this plate is provided with a threaded opening 15 in which is fitted a threaded stud 16 which is adapted to enter corresponding holes in certain molding parts in order to hold the latter on the machine plate while being jarred.

The molding parts are designed especially for forming sand molds for the casting or cored twyers or other similar tubular objects having cored or hollow walls. The mold comprises the drag 18, intermediate or cheek portion 19 and cope 20 which will be assembled as shown in Fig. 5 with the central core 21 and annular or shell core 22. The flask sections are designated by the numeral 23. For forming the drag 18 use is made of a mold bottom plate 24 of a size to fit into the depression 14 in the machine plate and be centered thereby. This bottom plate is provided with a central elevated portion 26 which forms a depression or "core print" in the drag in order to receive the lower end of the center core 21. The mold shown also comprises the shell core 22 having hole-forming and anchoring projection portions 28. The drag is provided with holes 29 through which these anchoring members pass and to form these holes the mold bottom plate 24 has secured thereto a set of studs 30, shown as having a screw fit in openings in the mold bottom plate. Four such studs are employed.

In order to adapt the mold bottom plate 24 for making molds for castings of different sizes and having pipe holes on different circles, it is provided with a plurality of sets of holes 31 for receiving the studs 30, Fig. 6 showing five sets of four holes each, each set being at a different distance from the center of the plate than the other sets. In order to prevent the sand from filling the holes not occupied by studs 30, suitable closures are employed, such as threaded plugs 31ª, these closing the four sets of holes not occupied by studs. The drag is molded on this mold bottom plate and in a flask section 32 by the usual jarring operation underneath a reservoir 33. After the jarring is completed the sand is cut off at the top of the flask, the flask bottom plate 34 is then bolted in place, after which the flask is taken from the machine and turned upside down with the central depression or core print on top and holes 29 extending through the same.

To mold the cheek or intermediate portion 19 of the mold the mold bottom plate 24 is removed and in place thereof a centering ring 35 is placed in the depression 14 in the machine plate. The pattern 36 is provided on its bottom with a projecting ring portion 37 which fits into the ring 35, and is also provided with a threaded sleeve 38 for receiving the stud 16 on the machine plate, this serving to hold the pattern central and prevent it from rising. The pattern is made in two parts, having the part 36 provided on its top with a metal ring 39 to prevent wearing and having a central depression 40 corresponding in size with the opening 41 in ring 35, while the top part of the pattern or cope pattern 42 is provided with a central projecting portion 43 fitting in the part 40 and likewise in the opening 41 of the ring 35. These parts are made to interfit for storage, though in use the part 36 is used alone, as shown in Fig. 2. This part of the mold is jarred in the usual way and the sand is cut off at the top of the pattern and the mold portion 19 so formed is then placed upon the inverted drag portion but without inverting.

To make the cope portion the pattern 36 is removed and the cope pattern 42 is placed down onto the ring 35. This also has a threaded bushing or sleeve 44 for receiving the threaded stud 16 of the machine plate and also for holding a stud or column 45 to form a vent opening 46 in the cope. This cope portion is formed over the pattern described by the usual jarring operation and the sand is then cut off at the top of the flask and the cope portion is then placed on top of the intermediate or cheek portion of the mold. The center core 21 and ring core 22 will, of course, have been put in position on the drag portion before the cheek portion and cope are placed on the same.

The machine plate 2 is also adapted for making the center core 21, this being effected by the means shown in Fig. 4. In this case a core ring or plate 47 is placed down in the central depression 14 of the machine plate, fitting closely therein and being centered thereby. This core ring is provided with a central opening surrounded by a wall 48 and adapted to receive the core pan 49 provided with a perforated vent pipe 50, a core box 51 being used in conjunction with the same, the latter resting upon the flange or wall 49 of the core ring 47. It will thus be seen that the machine plate 2 having the depressed portion 14 is adapted for forming all three of the parts of the mold as well as the center core, this being effected by the interchangeable plates and rings fitting in the depression in the machine plate. The molding parts described are simple in construction and enable unskilled laborers to make sand molds which are accurate and of equal density and in a manner to insure the parts being properly assembled. Minor changes are possible without affecting the principle of the invention.

What I claim is:

1. Sand molding apparatus comprising a mold bottom plate, a plurality of studs secured to said plate, and a central projecting portion on said plate.

2. Sand molding apparatus comprising a mold bottom plate, provided with a plurality of sets of holes, studs secured in one set of said holes and closures for the other sets of holes.

3. Sand molding apparatus comprising a mold bottom plate provided with a plurality of sets of threaded holes, threaded studs fitting in one set of said holes, and threaded plugs for closing the remaining sets of holes.

4. Molding apparatus comprising in combination a machine plate provided with a central depression, a mold bottom plate fitting in said depression and provided with a central elevated portion and a number of studs, and a flask resting on said parts.

5. Molding apparatus comprising a machine plate provided with a central depression and a central stud, a centering ring fitting therein, a pattern provided with a central projection fitting into said centering ring, and a flask resting on said parts.

6. Molding apparatus comprising a machine plate provided with a central depression and a central threaded stud, a molding ring seated in said central depression, a pattern provided with a central projection and with a threaded bushing for receiving the stud of the machine plate, and a flask fitting on said parts.

7. Molding apparatus comprising a machine plate, a pattern member resting thereon and provided centrally with a threaded bushing, a threaded stud securing said bushing to the machine plate, and a vent forming stud also held by said bushing.

8. Molding apparatus comprising a machine plate provided with a central depression, a pattern seated on said machine plate and having a central projection fitting in the depression in the machine plate and provided with a central opening for receiving means for securing the pattern to the machine plate and a vent forming stud.

9. Sand mold-forming apparatus comprising in combination, a machine plate provided with a central depression, an annular plate fitting in said depression, and a pattern member having a projecting portion fitting the opening in said annular plate.

10. Sand mold-forming apparatus comprising in combination, a machine plate provided with a central depression and with a central threaded stud, and a pattern member having a projecting portion fitting in the depression in the machine plate and provided with a threaded bushing to receive the stud on said plate.

In testimony whereof, I the said WILLIAM D. BERRY have hereunto set my hand.

WILLIAM D. BERRY.

Witnesses:
  ROBERT C. TOTTEN,
  JOHN F. WILL.